United States Patent Office 2,888,380
Patented May 26, 1959

2,888,380

S-ETHYL CYSTEINE COMPOSITIONS FOR COMBATTING TUBERCLE BACILLI

Horace D. Brown, Plainfield, and Alexander R. Matzuk, Colonia, N.J., assignors to Merck & Co., Inc., Rahway, N.J., a corporation of New Jersey No Drawing. Application November 5, 1954
Serial No. 467,215

13 Claims. (Cl. 167—65)

This invention relates to novel compositions useful in combatting tuberculosis and particularly with new antituberculous compositions containing as the active ingredient S-ethyl cysteine and active derivatives thereof.

This application is a continuation-in-part of application Serial No. 339,902, filed March 2, 1953, now abandoned.

Tuberculosis is no longer the terrible scourge it was in the past largely due to our improved standard of living. It has, however, continued to incapacitate and kill many people throughout the world. The devastating path left in the wake of its progress has directed the efforts of doctors and scientists through the years to find methods for its control and final elimination. Although tuberculosis has not been conquered completely, considerable progress has been made by treating patients with compounds such as streptomycin, dihydrostreptomycin, paraminosalicylic acid and the like, as well as combinations of these and other compounds. These compounds are apparently effective by reason of their ability to inhibit the growth of the tubercle bacillus (*Mycobacterium tuberculosis*). Unfortunately, however, the continued use of such antituberculous agents sometimes results in the development of strains of the tubercle bacillus which are resistant to such agents. As a result, these agents lose their therapeutic effectiveness in patients infected with such resistant strains. Accordingly, great interest has been centered in finding other compounds which are active in inhibiting the growth of the tubercle bacillus.

An object of the invention is to provide novel compositions useful in inhibiting the growth of the tubercle bacillus. Another object to provide new compositions useful in the treatment of tuberculosis. A further object is to provide processes for the preparation of these new compositions. Other objects and the advantages of the invention will appear hereinafter.

According to the present invention, it has been discovered that novel compositions containing S-ethyl cysteine and/or salts, esters, and N-acyl derivatives thereof are useful in combatting tuberculosis. The activity of these compositions is considered to be bacteriostatic in nature and to exert a beneficial effect by preventing or retarding growth of common tubercle bacilli and also strains which have developed resistance to other medicinal agents commonly used in treatment of tuberculosis.

In addition to S-ethyl cysteine, derivatives thereof such as the alkali metal and alkaline earth metal salts such as the sodium, potassium, calcium and magnesium salts and other suitable physiologically acceptable active salts may be employed in producing these novel antituberculous compositions. Acid addition salts such as the hydrochloride, sulfate and citrate of S-ethyl cysteine are also useful in such compositions. Furthermore, esters of S-ethyl cysteine such as are derived from alkanols and alkenols, particularly those having from 1 through 8 carbons like the methyl, ethyl, propyl, allyl, butyl and isopropyl esters of S-ethyl cysteine and acid addition salts thereof are also suitable for use in these antituberculous compositions. In addition, N-acyl derivatives of S-ethyl cysteine and its salts and esters, particularly N-acyl derivatives thereof derived from monobasic, dibasic and tribasic saturated and unsaturated carboxylic acids having 1 through 8 carbons such as N-formyl-S-ethyl cysteine, N-acetyl-S-ethyl cysteine, alkaline earth salts of N-carboxy-S-ethyl cysteine, N-benzoyl-S-ethyl cysteine, N-phenylacetyl-S-ethyl cysteine, S-ethyl cysteine malonate, succinate, tartrate and the like also possess antituberculous activity and accordingly are useful in the compositions of this invention. N-benzylidene-S-ethyl cysteine, although not technically an N-acyl derivative, also may be used in these compositions and for the purposes of this invention is intended to be encompassed by the term: N-acyl.

S-ethyl cysteine and its salts and esters have an asymmetric carbon and may accordingly be employed in these compositions in the DL, D or L optical forms. Preferably, however, the L form of S-ethyl cysteine and its active derivatives are employed to obtain the benefits of the physiological activity associated with this form.

The novel antituberculous compositions of this invention comprise S-ethyl cysteine or an active derivative thereof such as mentioned above combined with a physiologically acceptable carrier such as those used routinely in pharmacy. The resulting compositions may be compounded into unit-dosage forms suitable for use in the treatment of tubercle bacilli infections. Such unit-dosage forms like tablets, capsules, pills, suspensions and powders may be formulated containing any concentrations of one or more of the active ingredients appropriate for treatment of the existing state of infection. Such compositions may contain a minimum or mere trace of active substance but for practical treatment of infections it is desirable to use compositions having at least 0.05% and up to 80% by weight of active substance, i.e. S-ethyl cysteine or derivative thereof. Suitable unit-dosage forms may conveniently contain from about 5 to 1000 milligrams but preferably from about 50 to 500 milligrams per unit.

Unit-dosage compositions in tablet form may be conveniently produced by intimately dispersing S-ethyl cysteine or a derivative thereof with a solid carrier plus the necessary lubricants, binders and disintegrating agents to form a mixture suitable for tableting. Solid carriers such as sugar, talc, alginic acid and starch are examples of carriers which may be employed in making satisfactory tablets. Lubricants like mineral oil, magnesium stearate and stearic acid, binders such as gum and gelatin and disintegrating agents such as starch and citric acid with alkali metal bicarbonates are examples of other components useful in preparing unit-dosage tablets. The resulting tablets may be coated with agents such as sugar and shellac, if desired. Flavors and coloring materials may also be added. One representative tablet may be prepared having the following composition:

| Components: | One tablet (gm.) |
|---|---|
| S-ethyl-L-cysteine | 0.2500 |
| Talc powder | 0.1000 |
| Sucrose powder | 0.0250 |
| Corn starch (10% paste) | 0.0091 |
| Corn starch powder | 0.0500 |
| Sodium lauryl sulfate powder | 0.0050 |
| Magnesium stearate | 0.0100 |
| | 0.4491 |

The S-ethyl-L-cysteine is mixed with the talc and sucrose on a mortar and the powder sifted through a #20 screen, is moistened with the 10% starch paste and granulated by passing through #8 screen. The granule is dried for 48 hours at 40° C., and then passed through a #12 screen after which it is sifted through a #40 screen to separate the fines. The corn starch, sodium lauryl sulfate, and magnesium stearate are mixed and the powdered mixture sifted through a #40 screen. The powder is combined with the fine granules, mixed well and then mixed with the other granules. The fully blended mixture is compressed with a 14/32" deep cup punch into tablets. It is coated with shellac, sugar etc. as desired.

Another typical tablet may have the composition:

| Component: | Amount of component (gm.) |
| --- | --- |
| S-ethyl-L-cysteine | 0.050 |
| Magnesium carbonate | 0.250 |
| Gelatin | 0.025 |
| Sucrose | 0.100 |
| Magnesium stearate | 0.005 |
| Talc powder | 0.010 | and be prepared by conventional means. In these and other similar tablets other active S-ethyl cysteine compounds such as S-ethyl-DL-cysteine, N-acetyl-S-ethyl-DL-cysteine, N-formyl-S-ethyl-L cysteine and additional active compounds such as previously disclosed may be employed in whatever concentrations are satisfactory and desirable.

Instead of tablets, mixtures of an active antituberculous agent and solid carrier may be used to fill gelatin capsules of different sizes and containing varying amounts of active ingredient. A capsule containing 50 to 500 mg. of active material is a useful size. A typical soft gelatin capsule may be prepared by milling S-ethyl-L-cysteine and sufficient mineral oil to form a paste which is then filled into the soft gelatin capsule. A ratio of active material to mineral oil of about 50 to 1 is effective in capsules.

Powders can also be produced by mixing the active ingredient with a solid carrier. The powder mixture can be dispersed in unit-dosage packets. One such packet may contain 0.25 gm. of N-acetyl-S-ethyl-L-cysteine and 0.25 gm. of lactose.

Liquid unit-dosage forms may be produced by use of a suitable liquid carrier such as water, oils or other pharmaceutically acceptable solvents. Such liquid compositions may be employed for oral medication as such, mixed with other liquids or as liquid-filled capsules. Flavoring agents and suspending agents may be added as required.

A composition can also be prepared which is suitable for spraying as an aerosol in fine particles to be absorbed in the respiratory tract. This method of administering the S-ethyl cysteine compounds is particularly effective in that it makes the active compound available to attack the infecting organism in the manner of a topical application. The aerosols can be produced by nebulizing an aqueous solution, oil suspension or fine solid particles of the active material. The method of producing the aerosol is not critical and any of the conventional methods for producing aerosols may be used. The most applicable method is the "bomb" type pressurized container and the ordinary spray type nebulizer. In the bomb or pressurized container, which employs a gaseous propellant in liquid form such as chlorodifluroethane, dichlorodifluoromethane, trichlorofluoroethane, trichlorofluoromethane, nitrous oxide, carbon dioxide or the like, it is desirable to include in the formulation, in addition to the S-ethyl cysteine compound, an emulsifying agent, to avoid uneven distribution of the active compound and wetting agents, such as Tween, Span, Triton, polysorbate 80, sodium lauryl sulfate, glycol distearate, glycol dioleate and polyethylene glycols. If the S-ethyl cysteine compound is a solid it is preferably micronized or microatomized which leads to particles substantially all of which are below 50 microns and more desirably 20 microns when the bulk of the material is below 10 microns. The ratio of S-ethyl cysteine compound to propellant may vary over a large range depending largely upon the desired discharge rate. It is preferred, however, to use approximately 1 to 10 parts by weight of active material for each 100 parts of propellant. A typical example of a bomb type aerosol of the 12 oz. capacity is one containing 3 to 5 grams of a S-ethyl cysteine compound. A good propellant for this capacity bomb is a mixture of 150 grams of dichlorodifluoromethane and 150 grams of trichlorofluoromethane.

Compositions can be prepared in a similar manner for treating animals infected with tuberculosis. For example, a suitable composition for animals is produced by uniformly dispersing the active agent throughout a feedstuff for such animals. Thus, it has been found that about 0.2% by weight of active agent in the diet of mice infected with tuberculosis is adequate for successfully combatting the disease.

The following examples are included to illustrate ways of preparing certain specific derivatives of S-ethyl cysteine which may be used in the novel compositions of this invention.

EXAMPLE 1

*N-formyl-S-ethyl-L-cysteine*

A mixture of 15 gm. of S-ethyl-L-cysteine and 22 ml. of anhydrous formic acid was heated on a stream bath for 4 hours. Water and excess formic acid were distilled off under reduced pressure. After adding 22 ml. of anhydrous formic acid to the residue, heating, and distillation was continued as before for 3 hours. This was repeated again. Then 200 ml. of ethyl acetate was added to the residue, the mixture heated to boiling and the resulting solution filtered in the presence of activated charcoal. On cooling the filtrate in ice, cream-colored crystals of N-formyl-S-ethyl-L-cysteine formed which were filtered off and recrystallized from ethyl acetate; M.P. 122–125° C. with previous softening at 119° C.

EXAMPLE 2

*N-acetyl-S-ethyl-DL-cysteine*

Six grams of S-ethyl-DL-cysteine, 100 ml. of glacial acetic acid and 6 ml. of acetic anhydride are mixed with cooling in ice water. After holding the mixture at room temperature for three hours to complete solution the solvent was removed under reduced pressure to give N-acetyl-S-ethyl-DL-cystein; M.P. 142° C.

EXAMPLE 3

*Sodium salt of N-acetyl-S-ethyl-L-cysteine*

Ten grams of S-ethyl-L-cysteine was dissolved in a mixture of 31 ml. of water and 47 ml. of 2 N sodium hydroxide at 0° C. While the solution was maintained at 0° C., 3.2 ml. of acetic anhydride was added dropwise with shaking. After 3 minutes, 31 ml. of 2 N sodium hydroxide and 3.2 ml. of acetic anhydride were added as before. This was repeated 4 times and the temperature of the mixture allowed to come to room temperature. After 15 minutes it was made just acid to Congo red paper with sulfuric acid. Some sodium sulfate separated and was filtered off. The filtrate was taken to dryness at not over 20° C. The residue was taken up in absolute alcohol at room temperature, the solution filtered and the alcohol removed below 20° C. The resulting syrup was treated with 10 ml. of water and sodium bicarbonate until slightly alkaline to alkacid paper. The solution was evaporated to dryness under reduced pressure, dried and the residue taken up in warm methanol. It was filtered with charcoal and treated with anhydrous ether until precipitation was completed. The precipitate was a stiff syrup. The solvent was decanted and the syrup taken up in 15 ml. of warm n-butanol. Addition of ether gave a sticky precipitate which began to powder. It was filtered but in air became sticky again. After drying over sulfuric acid it became powdery but air again made it sticky. In a sealed capillary the sodium salt of N-acetyl-S-ethyl-L-cysteine softened at 80° C., began to melt around 112° C. but did not completely melt until 140° C.

EXAMPLE 4

S-ethyl-L-cysteine ethyl ester hydrochloride

Twenty-five grams of S-ethyl-L-cysteine was added to 45 ml. of absolute alcohol and dry hydrogen chloride passed into the mixture. The solution was heated at reflux for one-half hour with the flow of hydrogen chloride continued slowly. Alcohol and hydrogen chloride were removed under reduced pressure and anhydrous ether added to the residue. The crystals were filtered and recrystallized to give S-ethyl-L-cysteine ethyl ester hydrochloride; M.P. 137° C. with previous softening.

EXAMPLE 5

S-ethyl-L-cysteine ethyl ester

Five grams of S-ethyl-L-cysteine ethyl ester hydrochloride was dissolved in 35 ml. of chloroform previously fractionated thru a Widmer column. Dry ammonia was passed into the solution for 5 minutes. The solution warmed and a precipitate of ammonium chloride appeared. The solution was filtered, the chloroform evaporated and volatiles removed at 3 mm. vacuum to room temperature to give a residue of pure S-ethyl-L-cysteine ethyl ester.

EXAMPLE 6

Calcium salt of N-carboxy-S-ethyl-L-cysteine 0.08 mole of calcium oxide was dissolved in 300 ml. of water, cooled and to this solution was added 0.08 mole of S-ethyl-L-cysteine. Some excess carbon dioxide was added, the mixture filtered, the filtrate diluted with alcohol and chilled in ice. The calcium salt of N-carboxy-S-ethyl-L-cysteine precipitates and is recovered by filtration. It melts at 245–150° C. with evolution of carbon dioxide.

Various changes and modifications of the invention can be made and, to the extent that such variations incorporate the spirit of this invention, they are intended to be included within the scope of the claims.

What is claimed is:

1. As a new article of manufacture, a composition in unit-dosage form for treatment of tubercle bacilli infections containing from about 5 mg. to about 500 mg. of a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts, and a physiologically-acceptable pharmaceutical carrier for said compound selected from the group consisting of starch, talc, mineral oil and sugar.

2. As a new article of manufacture, a capsule in unit-dosage form containing a mixture of about 50 mg. to about 500 mg. of a compound selected from the group consisting of S-ethyl cysteine, its alkali metal salts, its alkaline earth metal salts, its esters, derived from a member selected from the group consisting of alkanols and alkenols having from 1 to 8 carbon atoms, and its non-toxic acid addition salts and a physiologically-acceptable pharmaceutical carrier for said compound selected from the group consisting of starch, talc, mineral oil and sugar.

3. As a new article of manufacture a gelatin capsule in unit-dosage form containing a mixture of about 50 to about 500 mg. of S-ethyl cysteine and sufficient mineral oil to form a paste.

4. As a new article of manufacture, for use in combatting tubercle bacilli infection, a tablet in unit-dosage form comprising a mixture of about 50 mg. to about 500 mg. of a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts and a physiologically-acceptable pharmaceutical carrier for said compound selected from the group consisting of starch, talc, mineral oil and sugar.

5. As a new article of manufacture, for use in combatting tubercule bacilli infections, a tablet in unit-dosage form comprising a mixture of about 50 mg. to about 500 mg. of a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts, a physiologically-acceptable pharmaceutical carrier for said compound selected from the group consisting of starch, talc, mineral oil and sugar, and lubricants, binders and disintegrating agents normally employed in tablets for pharmaceutical use.

6. As a new article of manufacture, for use in combatting tubercule bacilli infections, a tablet in unit-dosage form, consisting essentially of 0.25 gm. of S-ethyl cysteine, 0.1 gm. of talc, 0.025 gm. of sucrose, 0.0091 gm. of a 10% paste of corn starch, 0.05 gm. of corn starch, 0.005 gm. of sodium lauryl sulfate and 0.01 gm. of magnesium sterate.

7. As a new article of manufacture, for use in combatting tubercule bacilli infections, a tablet in unit-dosage form, consisting essentially of 0.05 gm. of S-ethyl cysteine, 0.25 gm. of magnesium carbonate, 0.025 gm. of gelatin, 0.1 gm. of sucrose, 0.005 gm. of magnesium stearate and 0.01 gm. of talc.

8. An aerosol-producing composition for use in combatting tubercule bacilli infections, comprising a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts, and a non-toxic pressure-generating propellant.

9. As an article of manufacture for use in combatting tubercule bacilli infections, an aerosol bomb equipped with a valve for releasing its contents to the atmosphere, comprising a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts, and a non-toxic pressure-generating propellant, there being present from about 1 to about 10 parts by weight of said compound for every 100 parts by weight of the propellant.

10. An aerosol-producing composition comprising about 3 to 5 grams of S-ethyl cysteine and about 300 grams of a mixture of equal parts of dichlorodifluoromethane and trichlorofluoromethane as a propellant.

11. A method of combatting tubercule bacilli which comprises subjecting said organisms to a composition comprising not less than about 0.05% of a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts.

12. A method of combatting tuberculosis which comprises administering a composition comprising not less than 0.05% of a compound selected from the group consisting of S-ethyl cysteine, its alkali metal salts, its alkaline earth metal salts, its esters derived from a member selected from the group consisting of alkanols and alkenols having from 1 to 8 carbon atoms, and its non-toxic acid addition salts, to a human host infected with tubercule bacilli.

13. A method of combatting tuberculosis which comprises administering a composition comprising not less than 0.05% of S-ethyl cysteine to a human host infected with tubercular bacilli.

References Cited in the file of this patent

UNITED STATES PATENTS 2,618,561    Spinka _____ Nov. 18, 1952

FOREIGN PATENTS 264,960    Great Britain _____ Feb. 3, 1927

OTHER REFERENCES

Raymond: Proc. Soc. Exptl. Biol. and Med., vol. 70, 1949, pp. 43–45.